Sept. 16, 1952  A. W. KRIEG ET AL  2,610,591
MACHINE FOR DEPOSITING CANDY ICING ON CARDS
Filed Aug. 17, 1948  11 Sheets-Sheet 5

Inventors.
Anthony W. Krieg
Joseph Mayer
By
Attorney

Sept. 16, 1952    A. W. KRIEG ET AL    2,610,591
MACHINE FOR DEPOSITING CANDY ICING ON CARDS
Filed Aug. 17, 1948.    11 Sheets-Sheet 9

Inventors.
Anthony W. Krieg
Joseph Mayer
By
Attorney

Sept. 16, 1952  A. W. KRIEG ET AL  2,610,591
MACHINE FOR DEPOSITING CANDY ICING ON CARDS
Filed Aug. 17, 1948  11 Sheets-Sheet 10

FIG. 19

Inventors.
Anthony W. Krieg
Joseph Mayer
By
Attorney

Patented Sept. 16, 1952

2,610,591

UNITED STATES PATENT OFFICE 2,610,591

MACHINE FOR DEPOSITING CANDY ICING ON CARDS

Anthony W. Krieg and Joseph Mayer, Brooklyn, N. Y., assignors to Cypress Novelty Corporation, Brooklyn, N. Y., a corporation of New York Application August 17, 1948, Serial No. 44,623

6 Claims. (Cl. 107—27)

This invention relates particularly to the manufacture of what are frequently called cake ornaments, such as candle holders and Christmas and birthday greetings and other forms of letters and symbols which have heretofore been made on hand operated machines.

These ornaments are formed of a plastic substance called icing deposited in a plastic condition onto flexible paper cards or the like and have to be carefully handled until they become hard enough to be packaged and shipped.

The present invention has as its main object to minimize hand operations, speed up production and minimize spoilage.

Special problems are involved due to the fact that the cards on which the icing is deposited are quite flexible and the icing is deposited in a plastic condition and requires several hours to dry.

Accordingly we provide means for automatically depositing icing in the desired form from casting dies upon suitable cards and automatically raising and lowering the cards to and from the dies. These cards may be inserted beneath the dies and removed by hand but are preferably automatically placed on a conveyor synchronized with the depositing action. Preferably the cards are handled in pairs and after the icing is deposited transferred to pallets which hold a number of pairs and are automatically passed beneath the main conveyor to an unloading position.

As these pallets are filled they are removed by the operator and placed in drying racks. As the pallets are substantially rigid they hold the flexible cards with the soft icing so that there is no danger of injury due to bending.

The drawings show one form of apparatus for carrying out the invention where the cards are handled in pairs which is most convenient and economical. It will be understood however that the machine may be arranged to handle successive single cards or successive groups of cards.

Figures 1, 2, 3, 4:
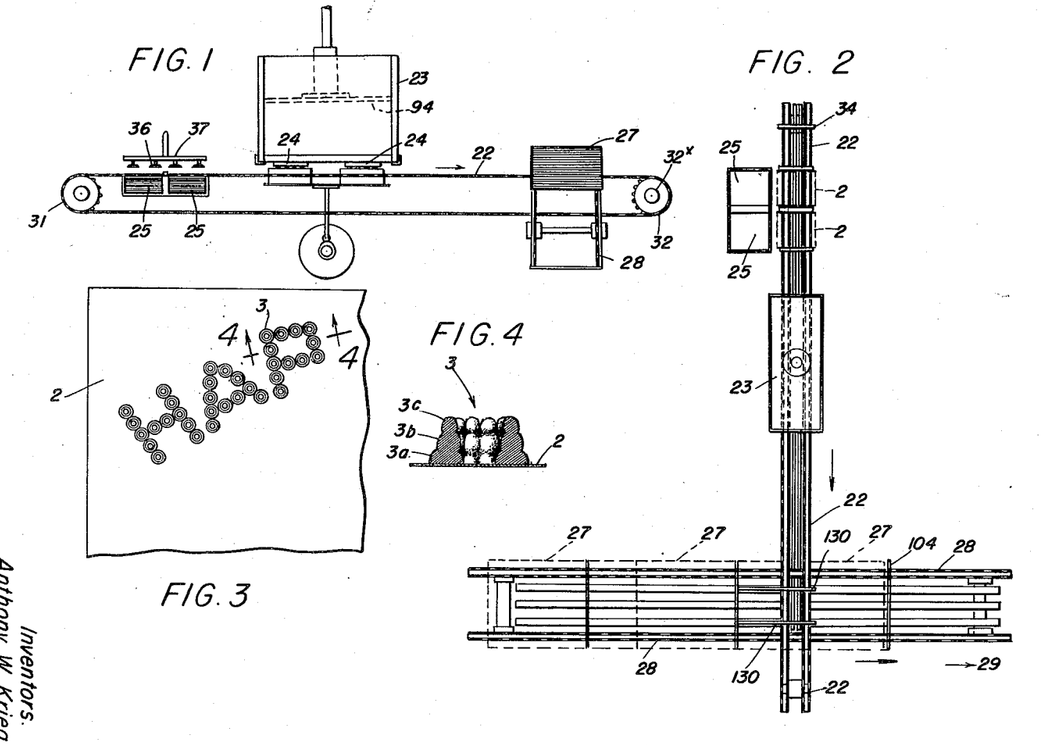
Fig. 1 is a front elevation of the principal elements of the machine in diagrammatic form.
Fig. 2 is a plan view of the same in diagrammatic form.
Fig. 3 is a fragmentary view of a card having typical deposits.
Fig. 4 is a fragmentary sectional view of a single letter taken on the section line 4—4 of Fig. 3.

The product of the machine and process is a card 2 of suitable size on which are deposited ornamental candle holders, letters, figures or the like such as "Xmas Greetings," "Happy Birthday," etc., formed of icing and represented by the fragment of card in Figs. 3 and 4 with the letters "HAP." A section (on line 4—4 Fig. 3) of a deposited article 3 which may be regarded as a candle holder or the letter "P" of Fig. 3 is shown in Fig. 4. Preferably the article is deposited in two or more layers 3a, 3b, 3c. These articles are deposited on the flexible supports preferably paper cards having some stiffness to which they adhere firmly when dry so that they can be handled, packed and shipped without damage to the articles.

Figures 7, 8, 9:
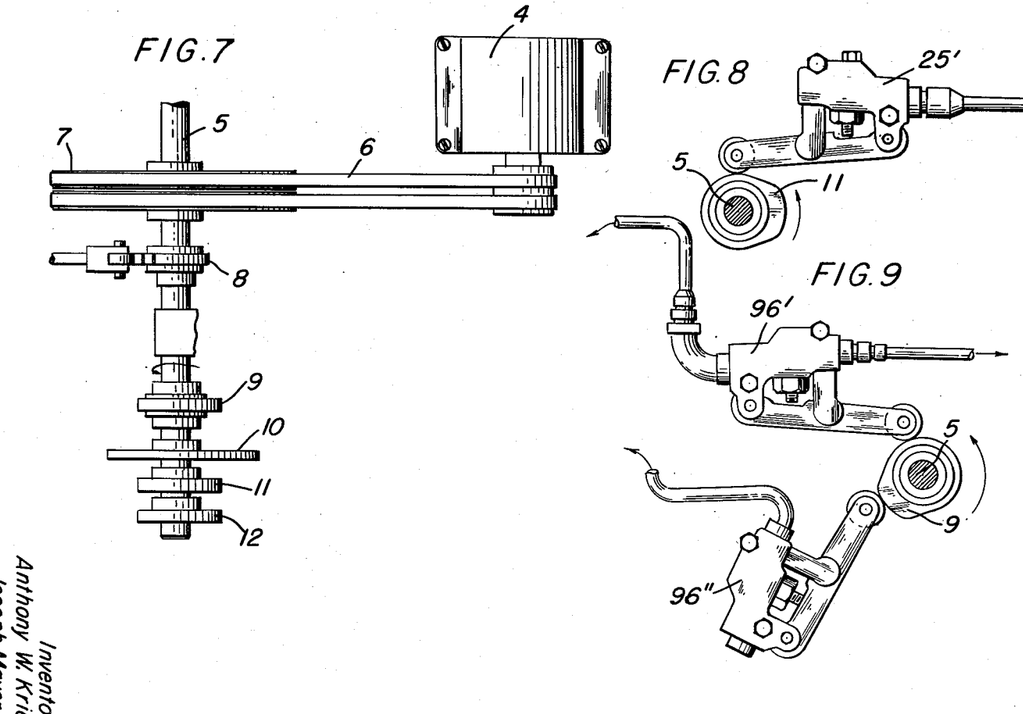
Fig. 7 is a plan view of the main cam shaft.
Fig. 8 is a fragmentary sectional view showing the cam and valve members for admitting air pressure to separate the cards at the card supply.
Fig. 9 is a fragmentary sectional view showing the cam and valve members for controlling air pressure for operating the piston that raises and lowers the plunger in the icing chamber.
Figures 10, 11:
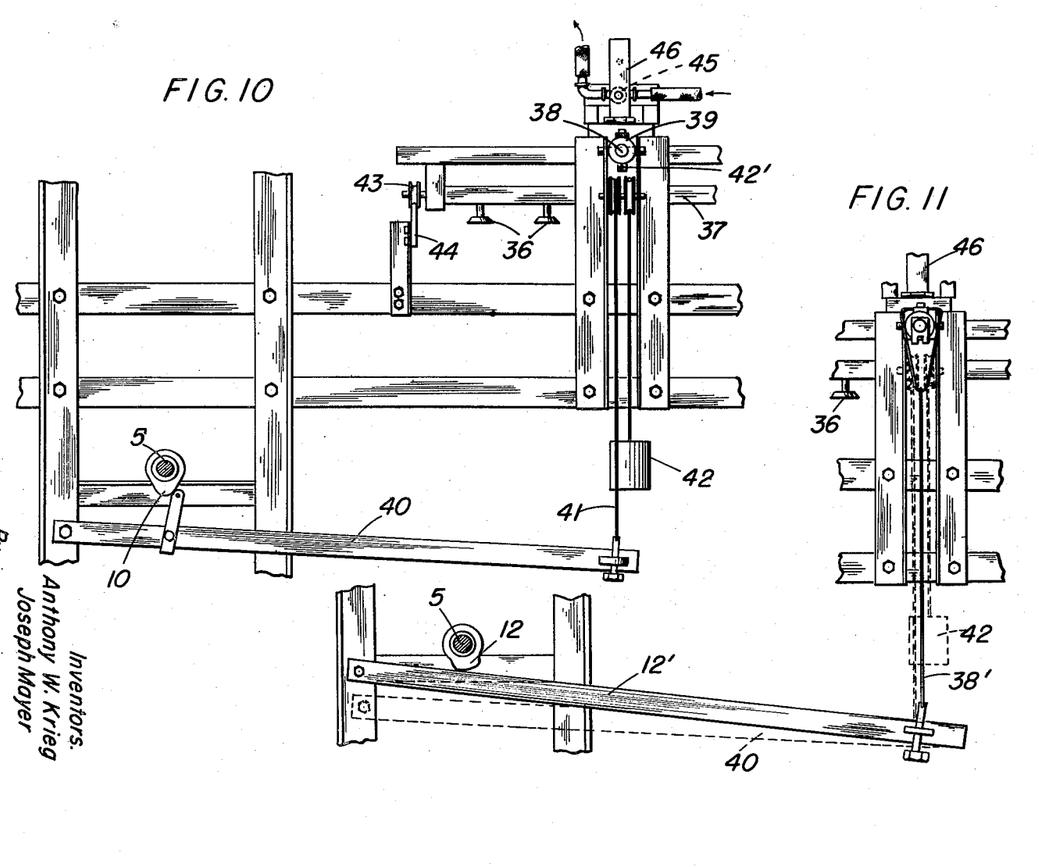
Fig. 10 is a side view and section showing the cam and means for moving the card pick-up head in one direction.
Fig. 11 is a side view and section showing the cam and means for tilting the card pick-up head.

The card pick-up, chain feed and air pressure valves are all controlled by a motor 4 which drives the main cam shaft 5 by means of a belt 6 on pulley 7. This shaft 5 has a cam 8 for raising and lowering the cards beneath the dies, a cam 9 for controlling air pressure to the piston that ejects the icing from the dies, a cam 10 for moving the card pick-up, a cam 11 for controlling the air blast for separating the top card of the supply stack, and a cam 12 for actuating the tilting of the card pick-up and also actuating the intermittent feed of the conveyor as will be later described.

The machine in its completely automatic form has a card conveyor 22 which travels intermittently under a receptacle 23 containing the icing which is deposited on the cards through dies 24, 24 having the desired outlet openings. These cards may be placed on the conveyor by hand or automatically from open supply boxes 25, 25. Preferably the cards are handled in pairs through the entire machine although this is not essential to the broad invention.

After the articles have been formed on the cards, they are transferred sequentially in pairs to pallets 27 which are fed by a conveyor 28 beneath the upper run of the conveyor 22 to a discharge or delivery point 29 from which the pallets with a number of pairs of cards on each are removed and placed in racks (not shown) to dry.

The conveyor 22 has two chains 30, 30 traveling on sprockets 31, 32. Between the chains are two tracks 33, 33 for supporting the cards. The chains have cross bars 34, 34 arranged at intervals so as to leave room for the successive cards between each two adjacent bars. As a card is dropped on the tracks and the conveyor moves, the card drags behind due to the friction on the tracks until a cross bar engages the card ahead of it whereupon the dropped card will travel with the cross bar of the conveyor. In this way, the cards are accurately located before they reach the die heads 24, 24. This eliminates the necessity of extreme accuracy in the placement of the cards on the conveyor.

In the form shown, the cards are supplied from the boxes 25, 25 by suction cups 36 which are carried by a pipe 37 on the end of a rod 38. This rod slides in the sleeve 39 which is pivoted on the frame so as to allow it to tilt. The rod 38 is moved rearwardly to the left (Fig. 5) by cam 10, arm 40 and cord 41 and to the right by a weight 42 and cord 42'. The front end of rod 38 has a roller 43 supported by a track 44. When the rod 38 is moved forward with the attached pipe 37 and suction cups 36, the roller runs off the end of track 44 and drops the suction cups on to the near edge of the top card in box 25. Suction is then applied at the cups 36 which are retracted with the card 2 which has been picked up. When the card arrives over the conveyor tracks 33, 33, the suction is broken and the card dropped in place.

Figure 5:
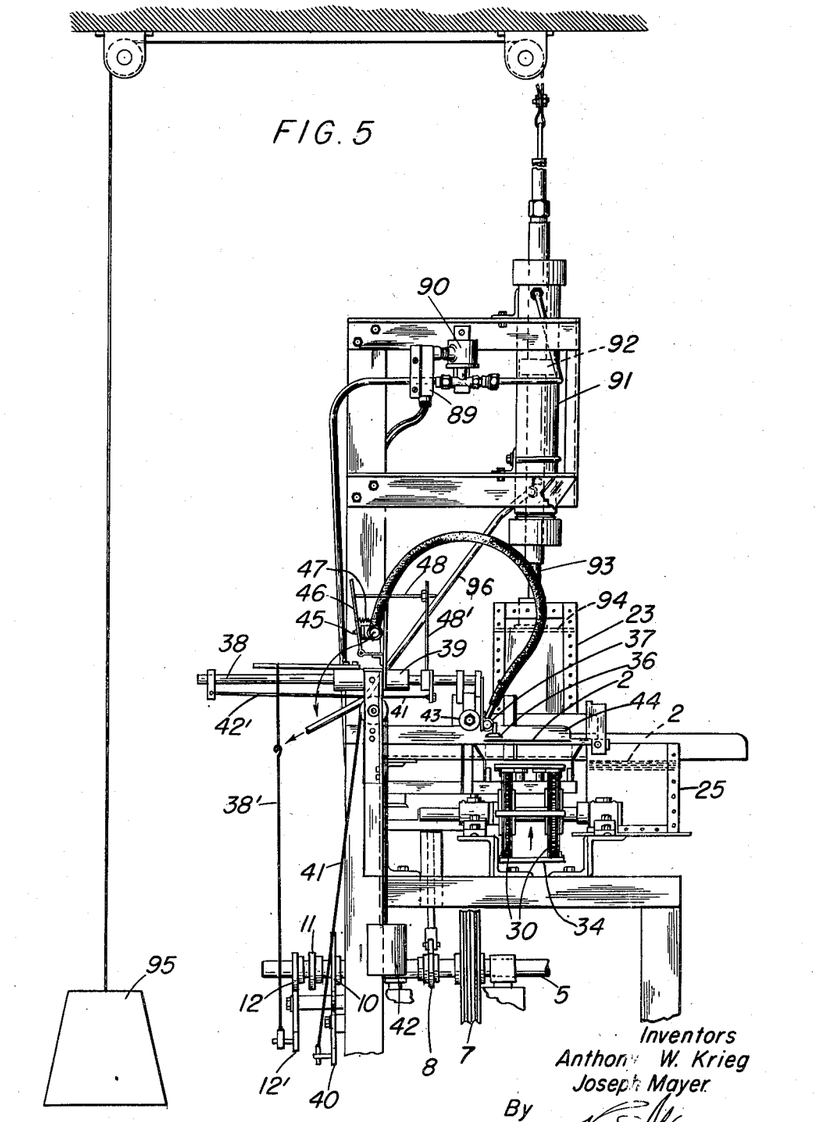
Fig. 5 is a fragmentary and elevation showing parts of the conveyor, the card pick-up mechanism and the pneumatic plunger control.

Suction is applied at the valve 45 so as to pick up the card at the proper moment. This valve is actuated by the arm 46 which is pivoted and biased to a closed position by the spring 47. Rod 48 is carried by rod 38 and carries a thrust member 48' which engages arm 46 when the rod 38 and the suction pick-up 36 are moved to position for dropping a card. In the position of Fig. 5, the valve 45 is open so that suction is ineffectual.

When the suction pick-up moves from left to right (Fig. 5) the roller 43 drops off the right hand end of track 44 and at the same time the valve 45 is closed by spring 47 so that suction is effective to pick up a card. On the return movement of rod 38 and the suction cups, the cam 12 engages lever 12' and applies a pull on cord 38' to tilt the rod 38 and attached parts and thus assist in lifting the suction device back on to the track 44.

Figure 16:
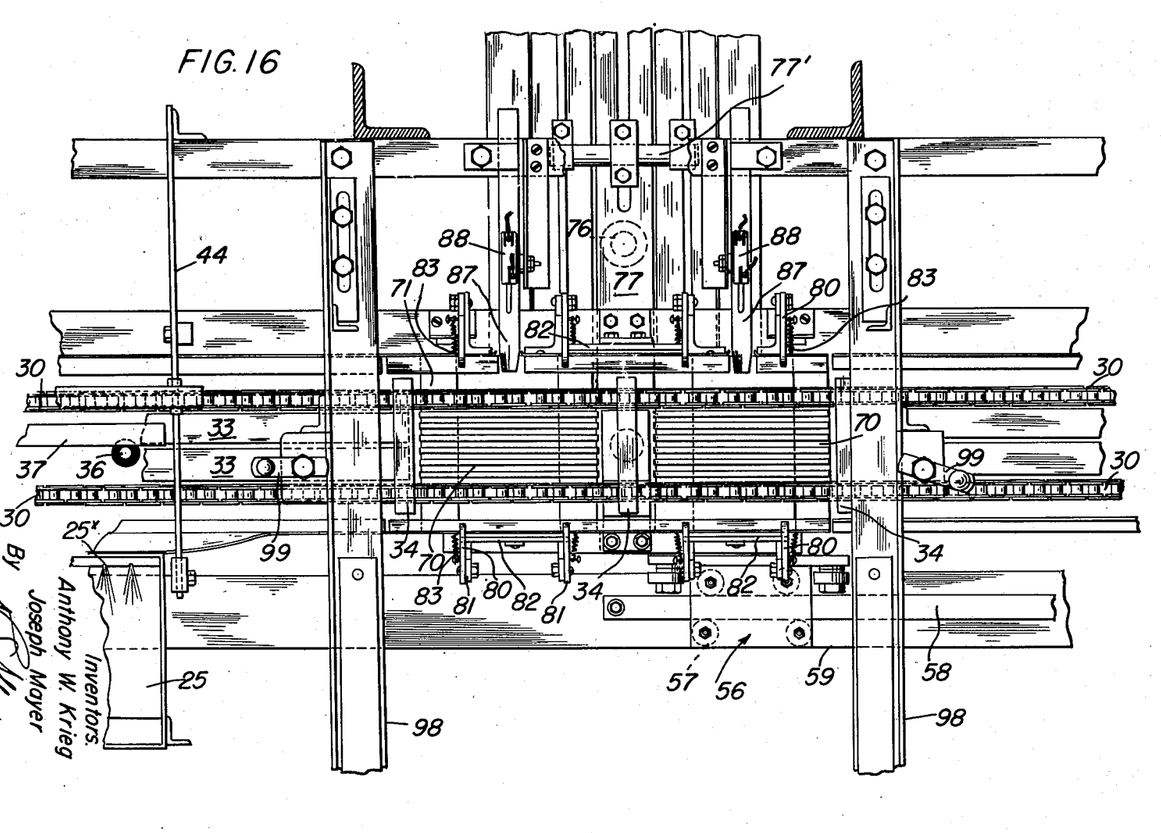
Fig. 16 is a plan view of the principal parts of the card carrying and control mechanism at the position which the cards occupy when the icing is to be deposited, and showing a fragment of the card supply.

Valve 25' of conventional form actuated by cam 11 (Fig. 8) controls the admission of air from outlet 25x at the upper edge of the stack 25 (Fig. 16) to ensure the separation of the top card when suction is applied to lift it from the stack.

Figure 6:
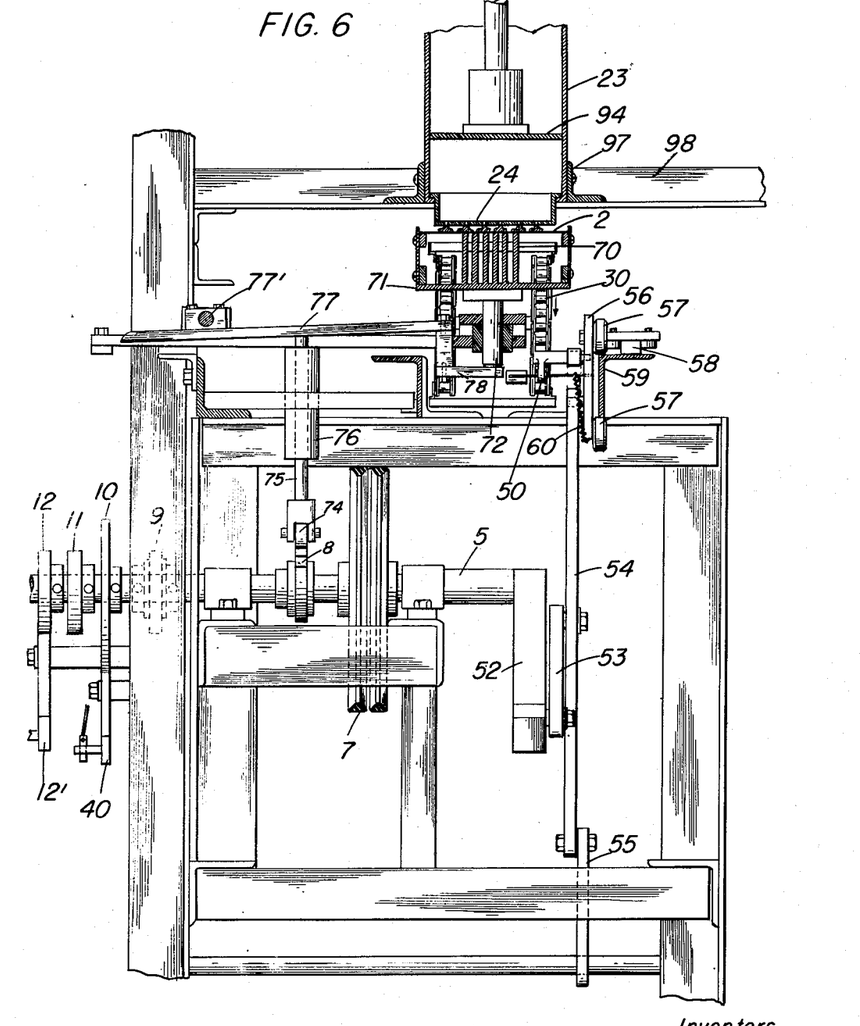
Fig. 6 is an end elevation on a scale larger than Fig. 5 showing parts of the icing feed mechanism in section.
Figures 12, 13:
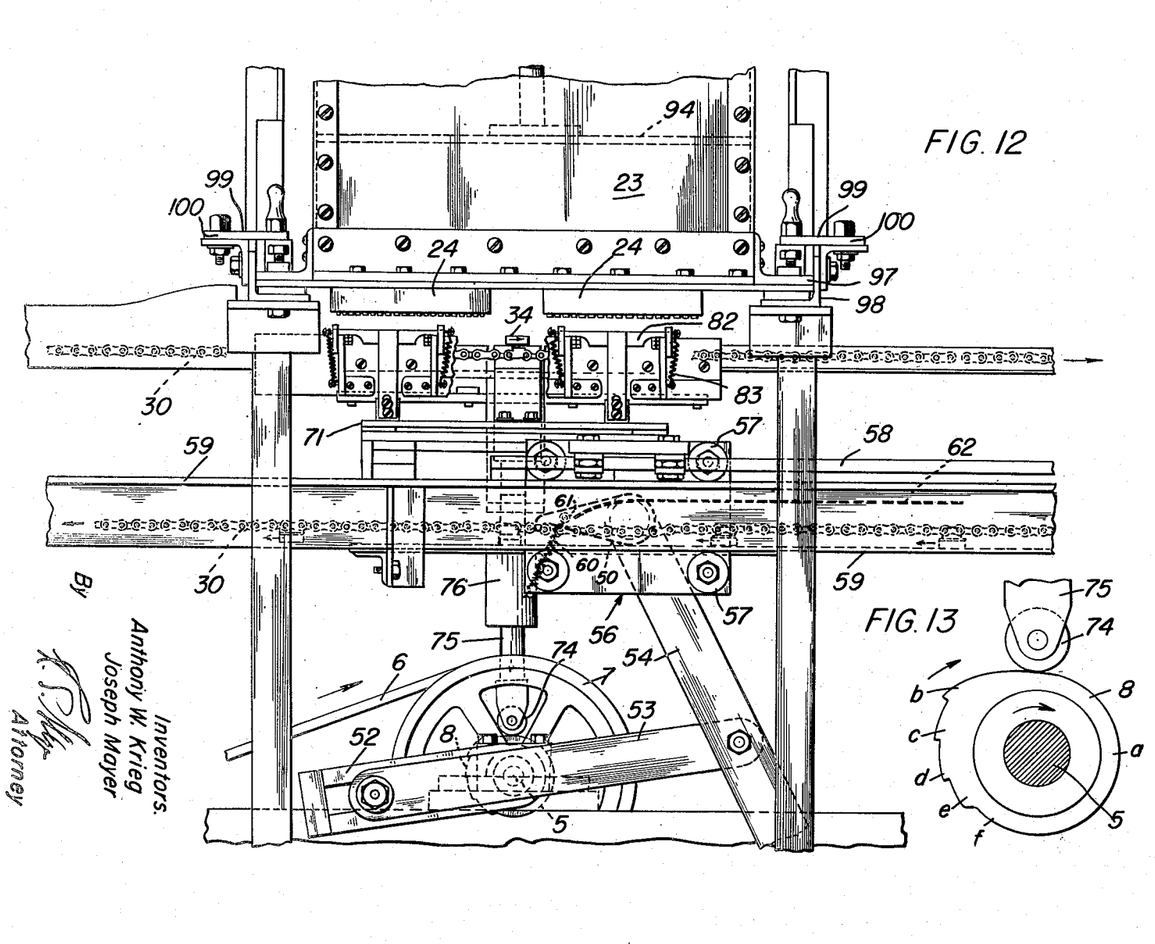
Fig. 12 is a front elevation of a part of the machine showing the container for the icing and a part of the conveyor and card handling device with the card grippers in the depressed position.
Fig. 13 is a fragmentary detail of the lifter control cam.
Figure 14:
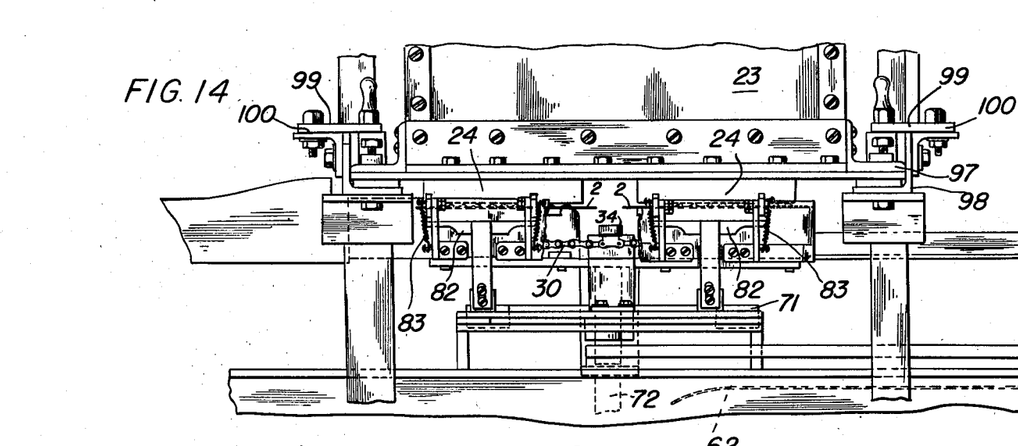
Fig. 14 is a view of some of the parts shown in Fig. 12 but with the card grippers and cards in the raised position.

The intermittent movement of the carrier chain or conveyor is accomplished by the spring pressed feed pawl 50 (Fig. 12) driven from the shaft 5 (Fig. 6) through the link motion consisting of crank arm 52 on shaft 5, link 53, lever 54, pivoted arm 55 and carriage 56. The carriage has rollers 57, 57 guided on track 58 and iron support 59. Lever 54 and pawl 50 are pivoted to the carriage and pawl 50 is drawn downward by spring 60. The lever 54 has moved to the left in Fig. 12 and moved the carriage with the feed pawl its full stroke. When the lever 54 moves to the right, the pin 61 on the pawl rides up on the left hand end of track 62 and the pawl drops down at the right hand end of track 62.

Beneath the die members 24, 24 the track for the card support is divided into two grid-like sections 70, 70 between the chains which are carried by a support 71. This is mounted on a post 72 which is movable vertically in suitable guides. The vertical movement of this post and the sections 70, 70 to and from the die faces 24, 24 is accomplished by the cam 8 on shaft 5 (see Fig. 13). When the cards are being moved by the conveyor, the roller 74 rests on the lower part $a$ of the cam 8, and the upper faces of grid sections 70, 70 are flush with the main surfaces of the tracks. When the cam 8 is rotated, the high part $b$ of the cam raises the grid sections to bring the cards which are on them up against the lower face of the dies 24, 24. The lifting movement (Fig. 6) is accomplished through the roller 74 and rod 75 which slides in sleeve 76 and engages the arm 77 (pivoted at 77') which has an extension 78 which projects beneath post 72. As the cam 8 continues to rotate, the roller 74 drops down to $c$ of the cam and then to $d$ thus allowing the icing to build up step by step the three layers shown in Fig. 4 as the icing is forced from the die outlets. Continued rotation of the cam 8 drops the roller 74 to parts $e$ and $f$ so as to completely retract the card and the deposited icing away from the dies 24.

Figure 15:
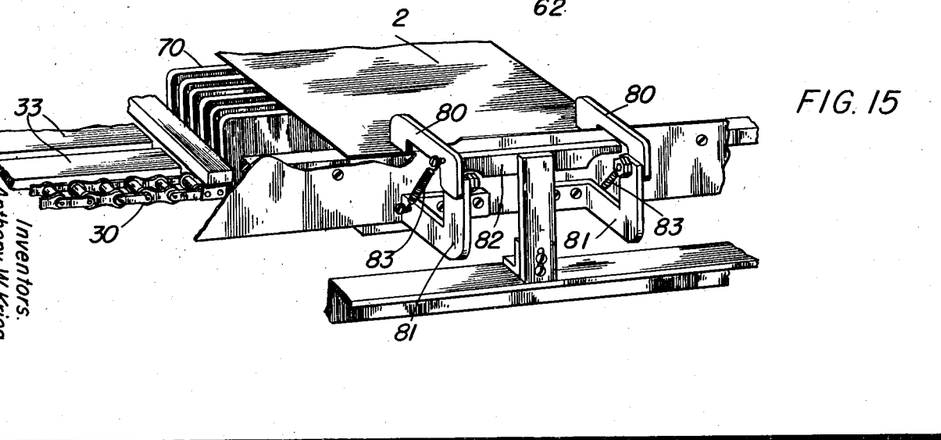
Fig. 15 is a fragmentary perspective view showing card gripping devices.

As the cards are lifted to the dies 24, 24 by the grids 70, 70 the opposite edges of the cards are grasped by jaws 80 which are pivoted to brackets 81 carried by the lifting support member 71. Bar 82 which is supported by a stationary part of the framework acts as a stop or abutment for the jaws when the grids and support member 71 are depressed so that the jaws automatically release the cards when the support 71 is dropped. When the grids and support member are raised, the springs 83 draw down the jaws 80 to grip the cards against parts of the lifter member (see Fig. 15). Thus the jaws serve to pull the cards away from the dies 24, 24 while the icing is being deposited and when the icing is shut off.

In order to avoid messing up the machine in case the cards do not arrive when they should beneath the dies, an automatic stop is provided. This has a laterally resilient finger 87 for each die section which controls a micro switch 88 in a circuit with solenoid 89.

Micro switch 88 controls the solenoid 89 which in turn actuates valve 90 which admits air under pressure into cylinder 91 above the piston 92 on rod 93 on the lower end of which is mounted the plunger plate 94 in container 23. The weight of piston 92, rod 93 and plunger 94 is counterbalanced by the weight 95 and the cylinder has an opening with a pipe 96 to admit air to the cylinder and permit exhaust when the pressure is applied above the piston. The valves 96' and 96" actuated by cam 9 control the admission to the cylinder 91 for raising and lowering the piston 92 and the attached plunger 94 in the container 23.

If for any reason a card is missing when the lifter grids are raised, the finger 87 is not moved, the micro switch 88 remains open, the solenoid is not energized and the valve 90 remains closed so that no icing is ejected.

The container 23 for the icing is closed at the bottom by the die plates 24, 24 which are detachable to facilitate interchanging die plates having the desired design. The container has side flanges 97, 97 slidably mounted on the transverse angle irons 98, 98 and held down removably by clamps 99, 99 which are hinged at 100, 100. The cover 23' of the container is detachably held in place by clamps 99'.

The cards with the deposited articles are transferred two at a time from the main conveyor 22 to the pallets 27 which in turn are carried by the transverse conveyor 28 to the delivery table 29.

Figures 17, 18:
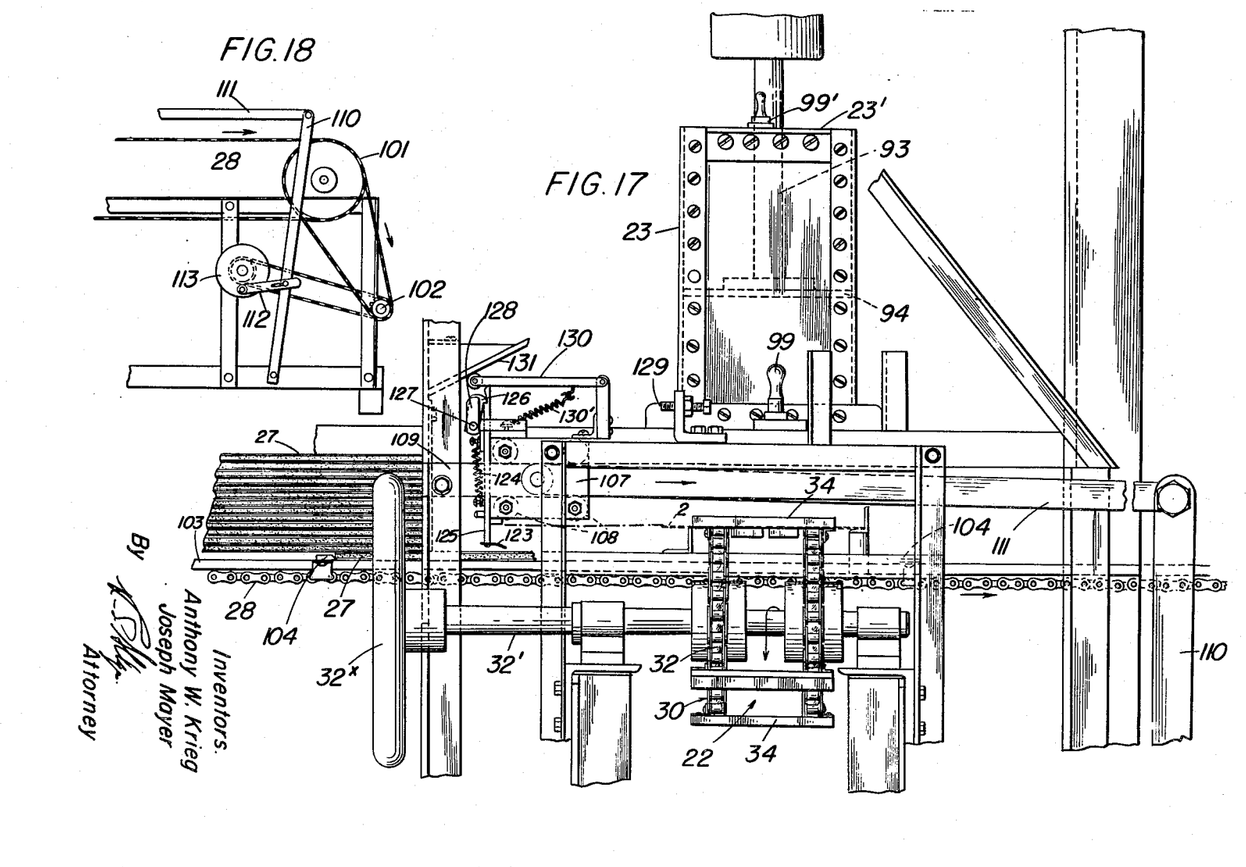
Fig. 17 is a side view of parts of the machine showing the mechanism for transferring the cards with the deposited icing to the pallets and their feeding mechanism, the transfer device being shown in the fully retracted position.
Fig. 18 is a diagrammatic illustration of the driving mechanism for the pallet feed.
Figure 19:
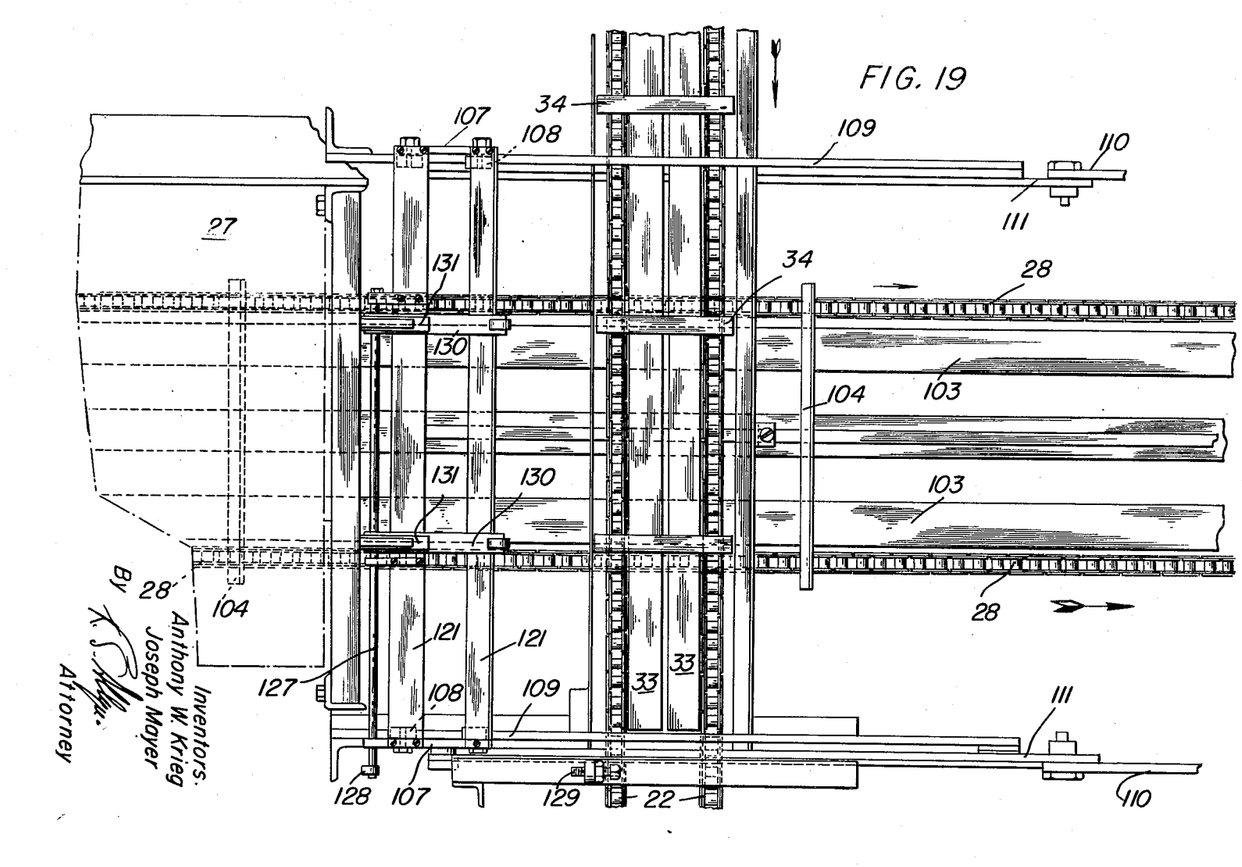
Fig. 19 is a fragmentary plan view of the parts shown in Fig. 17.

Conveyor chains 28 are carried on sprockets 101 driven from power shaft 102 (Fig. 18). The pallets 27 are supported on tracks 103 between the chains 28. The bottom pallet is moved by the cross bars 104 carried by chains 28 and the upper ones are held back by members 105.

The transfer mechanism has a carriage 107 with rollers 108 guided on rails 109. This carriage is moved back and forth by a lever 110 and link 111, lever 110 being oscillated by link 112 and crank 113 (Fig. 18) from shaft 102.

Figures 20, 21:
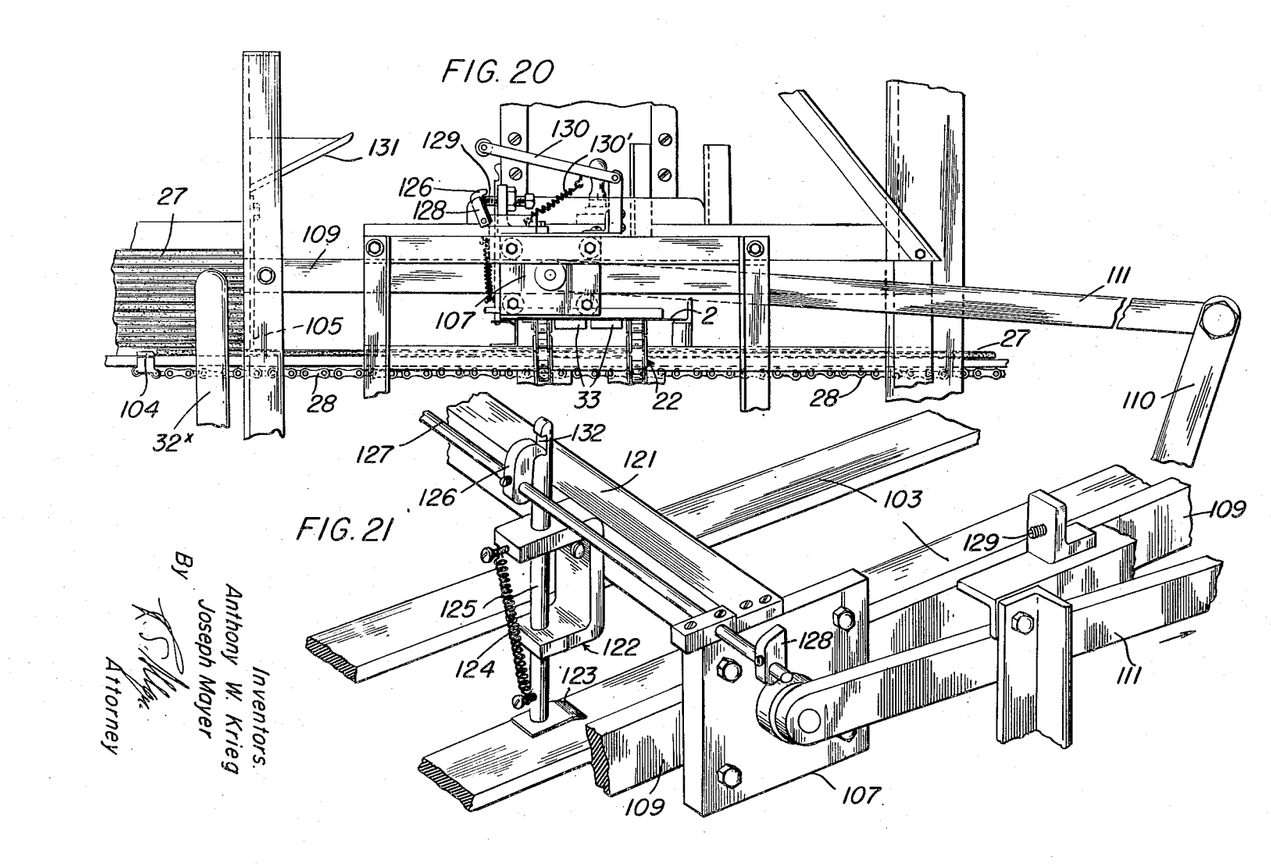
Fig. 20 is a side view of the parts shown in Fig. 17 showing the gripping device in the position in which it grips the card for transferring to the pallet.
Fig. 21 is a perspective view of part of the transfer gripping mechanism on an enlarged scale.

A cross bar 121 (see Fig. 21) connects the two carriage members 107 and carries two members for gripping the edges of cards on the main conveyor 22. Each gripping member has an upper jaw 122 and a lower jaw 123 which is vertically movable and biased upwardly toward jaw 122 by spring 124 attached to the guide rod 125.

In the position of the jaws 123 in Fig. 17, the jaws are spaced apart and the lower jaw 123 is held depressed by the pawl 126 fixed on rotatable shaft 127 which is supported in the side plates of the carriage and has a dog 128 (Fig. 21) outside the carriage in position to engage the stop 129 when the carriage is drawn along toward the main conveyor and its cards at the right. When the dog hits the stop 129 it tilts the shaft 127 and disengages the pawl 126 from the guide rod 125. Thereupon the spring 124 raises the rod with the jaw member 123 which snaps up against the edge of a card on the main conveyor and presses it against jaw 122. The spring 130' limits the upward movement of arm 130. The carriage is retracted and the card pulled from the conveyor 22 and deposited on the pallet 27 on track 103. This is accomplished by the action of the lever 130 which, as it moves to the left (Fig. 20), engages the incline 131 and is forced downwardly and moves the rod 125 downwardly to disengage the jaw 122 from the card and bring the rod 125 into position to receive the pawl 126 in notch 132 in the rod 125.

The transverse pallet conveyor 28 is driven continuously and is so timed that a number of pairs of cards (in this case four pairs) will be deposited on each pallet as it passes under the main conveyor and to the delivery table from which the pallets are removed by the operator and placed on a drying rack (not shown).

The main conveyor will be moved intermittently so as to handle the cards from stage to stage of the operation but may be moved by hand for adjustment, etc., for which purpose the shaft 32' of the sprockets 32, 32 is provided with a hand wheel 32x.

We claim:

1. A machine for forming icing ornaments on cards comprising tracks for supporting cards, a conveyor having cross bars for moving the cards along the tracks, a receptacle for containing icing having die openings mounted above said conveyor, said tracks having a section beneath said die openings movable to and from the die openings for lifting cards to said die openings, means for depositing icing in the form of ornaments onto cards supported on said movable section and means for gripping marginal portions of said cards while on said movable section and withdrawing the cards with the deposited ornaments from the die openings.

2. A machine for forming ornaments from plastic icing comprising tracks for supporting cards, means for intermittently feeding flexible cards along said tracks, a casting head for depositing icing on cards beneath the head, means for gripping marginal portions of cards on said tracks, means for lifting cards from the tracks to the casting head, means for forcing icing from the head upon the cards beneath the head, means for lowering the cards while the icing is being deposited and means for releasing the cards.

3. A machine for forming ornaments from plastic icing comprising tracks for supporting cards, means for intermittently feeding cards along said tracks, a casting head for depositing icing on cards beneath the head, means for gripping marginal portions of cards on said tracks, means for lifting cards from the tracks to the casting head, means for forcing icing from the head upon the cards beneath the head, contact fingers engaged by the cards beneath the casting head for releasing the means for forcing icing from the casting head, means for lowering the cards while the icing is being deposited and means for releasing the cards.

4. In a candy making machine, a longitudinal track, a conveyor for intermittently moving cards along said track, said track having a vertically movable section, a container having die outlets above said section, grippers for grasping the opposite marginal portions of a card on said section of track and raising the card up to and down from the die outlets, means for forcing icing from said outlets while the card is moving down from said outlets and sucking the icing back to break off the flow when the deposit is complete.

5. A machine of the character described comprising a support for a flexible card, a receptacle having a chamber for icing with a discharge orificed-head at its lower end, a pneumatically-actuated plunger in the chamber in said receptacle, an air duct leading to the chamber above said plunger, a valve controlling the passage of air through said duct to the chamber in said receptacle above said plunger, means for moving a card to and from the lower end of said head, and means actuated by a card when raised to said head for opening the valve to admit air pressure to the chamber of said receptacle.

6. A machine of the character described comprising a support for a flexible card, a receptacle for icing having a discharge orificed-head at its lower end, a pneumatically-actuated plunger in a chamber in the upper part of said receptacle, an air duct leading to the chamber above said plunger, a valve controlling the passage of air through said duct to the chamber in said receptacle above said plunger, means for moving a card to and from the lower end of said orifices and means for opening the valve to admit air pressure to the upper chamber of said receptacle, said card moving means including a cam having steps for retracting said card step by step to produce a deposit of icing in multiple layers.

ANTHONY W. KRIEG.
JOSEPH MAYER.

REFERENCES CITED

The following references are of record in the file of this patent:

UNITED STATES PATENTS

| Number | Name | Date |
|---|---|---|
| 259,542 | Holmes | June 13, 1882 |
| 467,003 | Ferraioli | Jan. 12, 1892 |
| 488,404 | Robertson | Dec. 20, 1892 |
| 583,376 | Hoppe | May 25, 1897 |
| 785,914 | Peters | Mar. 28, 1905 |
| 1,039,109 | Dennis | Sept. 24, 1912 |
| 1,438,280 | Westerman | Dec. 12, 1922 |
| 1,452,711 | Schroeder et al. | Apr. 24, 1923 |
| 1,460,825 | Peters et al. | July 3, 1923 |
| 1,570,405 | Salerno | Jan. 19, 1926 |
| 1,860,143 | Fuller et al. | May 24, 1932 |
| 1,876,211 | Dyhberg | Sept. 6, 1932 |
| 2,353,214 | Bobst | July 11, 1944 |
| 2,353,594 | Seagren | July 11, 1944 |
| 2,356,853 | Keller | Aug. 29, 1944 |
| 2,442,250 | Spain | May 25, 1948 |